US008537488B2

(12) United States Patent
Kawamoto et al.

(10) Patent No.: US 8,537,488 B2
(45) Date of Patent: Sep. 17, 2013

(54) METHOD FOR SPECIFYING CONTROL VALUE FOR CONTROLLING CLEARANCE ADJUSTMENT AMOUNT BETWEEN HEAD AND DISK, DISK DRIVE DEVICE AND MANUFACTURING METHOD THEREOF

(75) Inventors: Yasunori Kawamoto, Kanagawa (JP); Minoru Shimada, Kangawa (JP); Masahiro Etoh, Kanagawa (JP); Takuma Ito, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 12/077,365

(22) Filed: Mar. 17, 2008

(65) Prior Publication Data

US 2008/0225430 A1  Sep. 18, 2008

(30) Foreign Application Priority Data

Mar. 19, 2007  (JP) ................. 2007-071113

(51) Int. Cl.
*G11B 21/02* (2006.01)
*G11B 27/36* (2006.01)
*G11B 5/09* (2006.01)
*G11B 19/04* (2006.01)

(52) U.S. Cl.
USPC .................... 360/75; 360/31; 360/53; 360/60

(58) Field of Classification Search
None
See application file for complete search history.

(56) References Cited

U.S. PATENT DOCUMENTS

| 7,023,645 | B1 * | 4/2006 | Emo et al. ........................ 360/75 |
| 7,352,525 | B1 * | 4/2008 | Shrestha et al. ................. 360/75 |
| 7,385,778 | B2 * | 6/2008 | Kakiki .............................. 360/75 |
| 2004/0174627 | A1 * | 9/2004 | Kim et al. ......................... 360/31 |
| 2007/0230019 | A1 * | 10/2007 | Song et al. ....................... 360/75 |
| 2007/0253092 | A1 * | 11/2007 | Ikai et al. ......................... 360/75 |
| 2007/0268608 | A1 * | 11/2007 | Takahashi ........................ 360/75 |
| 2008/0278835 | A1 * | 11/2008 | Dakroub et al. ................. 360/31 |

FOREIGN PATENT DOCUMENTS

| JP | 10-222945 A | 8/1998 |
| JP | 2001-291218 A | 10/2001 |
| JP | 2006-269005 A | 10/2008 |

* cited by examiner

*Primary Examiner* — Andrew L Sniezek

(57) ABSTRACT

Embodiments of the present invention help to reduce damage of a head element portion or a magnetic disk in a procedure for specifying a heater power value for adjusting a clearance between the head element portion and the magnetic disk. In an embodiment of the present invention, an HDC/MPU sequentially performs data writing and reading while increasing heater power. The HDC/MPU further determines whether or not a head slider has retrieved the data properly. When the data cannot be retrieved properly, the HDC/MPU specifies a heater power value in a normal operation based on the heater power value at which the data could not be retrieved properly.

14 Claims, 7 Drawing Sheets

METHOD FOR SPECIFYING CONTROL VALUE FOR CONTROLLING CLEARANCE ADJUSTMENT AMOUNT BETWEEN HEAD AND DISK, DISK DRIVE DEVICE AND MANUFACTURING METHOD THEREOF

CROSS-REFERENCE TO RELATED APPLICATION

The instant nonprovisional patent application claims priority to Japanese Patent Application No. 2007-071113 filed Mar. 17, 2007 and which is incorporated by reference in its entirety herein for all purposes.

BACKGROUND OF THE INVENTION

Disk drive devices using various kinds of disks, such as an optical disk, a magneto-optical disk, and a flexible magnetic disk, have been known in the art. In particular, a hard disk drive (HDD) has been widely used as a storage device of a computer and has been one of indispensable disk drive devices for current computer systems. Moreover, the HDD has found widespread application such as a removable memory used in a moving image recording/reproducing apparatus, a car navigation system, a cellular phone, or a digital camera, as well as the computer, due to its outstanding characteristics.

Magnetic disks used in the HDD have a plurality of data tracks formed concentrically. Each data track has a plurality of servo data having address information and a plurality of data sectors containing user data recorded thereon. Between each servo data, a plurality of data sectors are recorded. A head element portion of a head slider supported by a swinging actuator accesses a desired data sector according to address information of servo data, which allows data writing to and data retrieving from a data sector.

In order to increase recording density of a magnetic disk, it is important to decrease variations in clearance between the head element portion flying over the magnetic disk and the magnetic disk; some mechanisms have been proposed to adjust the clearance. One of such mechanisms has a heater in a head slider which heats the head element portion to adjust the clearance (for example, refer to Japanese Patent Publication No. 2006-269005 "Patent Document 1"). In the present specification, it is called thermal fly-height control (TFC). The TFC generates heat by applying electric current to the heater to protrude the head element portion by thermal expansion. This reduces the clearance between the magnetic disk and the head element portion. Another mechanism has been known that uses a piezo element to adjust the clearance between the magnetic disk and the head element portion.

In an HDD having such a mechanism that adjusts the clearance between the head element portion and the magnetic disk or the clearance between the slider and the magnetic disk, it is required that a control value to achieve a proper clearance is specified. The control value is a heater control value such as heater power in the TFC or a voltage to be applied to a piezo element in the mechanism using the piezo element. It is desirable that the control value in a read/write operation is individually set to each head slider (see Patent Document 1, for example).

A technique to specify a proper control value for each head slider varies the clearance between the head element portion and the magnetic disk to detect contact between the head slider and the magnetic disk. The proper control value for the head slider can be specified from the control value at the contact. Contact of the head slider to the magnetic disk can be detected from, for example, a sensed value of an acoustic emission sensor, a positional error signal, read signal strength of a read element, a control value of a voice coil motor, or the like.

From the view point of increase in the number of components of the HDD and cost, use of a specific detector like an acoustic emission sensor is not preferable. On the other hand, positional error signals and read signal strength can be measured by normal functions of the HDD so that contact between the head slider and the magnetic disk can be detected without implementing a new circuit or the like in the HDD.

When positional error signals or signal strength is measured with servo signals, however, slight contact may not be detectable. Servo data are recorded discretely in a circumferential direction on the magnetic disk. If the oscillation cycle of the head slider due to contact with the magnetic disk is smaller than the cycle of discretely recorded servo data produced by the rotation of the magnetic disk, namely, if the oscillation frequency due to contact is greater than the reading frequency of the servo data, the oscillation due to contact cannot be properly detected from the servo signals. Typically, it is difficult to detect oscillation with the band width of a half or more of the band width of the servo data. Therefore, contact cannot be detected until greater contact or oscillation with a greater amplitude caused thereby (oscillation with a smaller frequency) arises.

Contact determination using measurements such as positional error signals or read signal strength usually uses dispersion of those measurements. Therefore, typically, the head slider goes around several times above the magnetic disk with one control value in order to obtain necessary measurements for calculating appropriate dispersion. That is, the head slider repeats to contact while going around many times over the disk in measuring data for contact determination. This allows the head slider and the magnetic disk to be worn to increase the possibility for damage to them.

It is therefore required to detect contact between the head slider (head element portion) and the magnetic disk within small contact and a short period. Another point to be considered is that a read element formed of an MR element such as a GMR or TMR is to be damaged more easily than a write element formed of a magnetic coil. When the head element portion, which is a part of the head slider, is made to be in contact with the magnetic disk, it is desirable for the vicinity of the write element to contact the disk rather than the vicinity of the read element.

BRIEF SUMMARY OF THE INVENTION

Embodiments of the present invention help to reduce damage of a head element portion or a magnetic disk, in a procedure for specifying a heater power value for adjusting a clearance between the head element portion and the magnetic disk. According to the particular embodiment disclosed in FIG. 1, the HDC/MPU 23 sequentially performs data writing and reading while increasing heater power. The HDC/MPU 23 further determines whether or not a head slider 12 has retrieved the data properly. When the data cannot be retrieved properly, the HDC/MPU 23 specifies a heater power value in a normal operation based on the heater power value at which the data could not be retrieved properly.

DETAILED DESCRIPTION OF THE INVENTION

Figure 1:
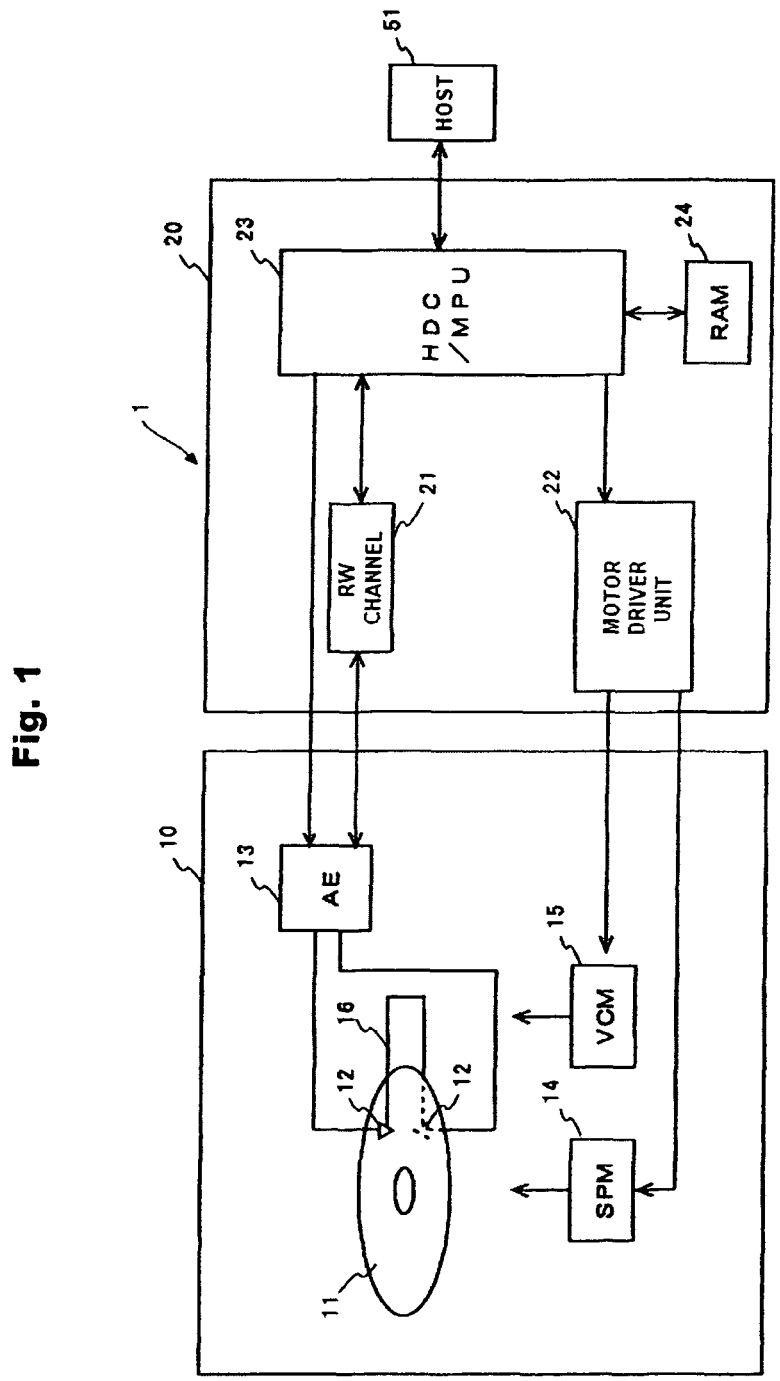
FIG. 1 is a block diagram schematically showing the entire configuration of an HDD according to one embodiment.

Embodiments of the present invention relate to a method for specifying a control value for controlling a clearance adjustment amount between a head and a disk, a disk drive device and a manufacturing method thereof, more particularly, a technique to specify the control value by writing data onto a disk and retrieving the data therefrom.

An aspect of embodiments of the present invention is a method for specifying a control value for controlling a clearance adjustment amount in a disk drive device in which a clearance between a head and a disk is adjustable. In one embodiment, the method adjusts the clearance by varying the control value and writes data onto the disk with the head at each of a plurality of different control values. It retrieves the data written at each of the plurality of different control values with the head and determines whether or not the data have been properly written at each of the control values. It specifies a control value for controlling a clearance adjustment amount in a normal operation based on a control value at which it has been determined that the data had not been written properly. Determining whether or not the data are properly written by writing and retrieving data varying the clearance achieves decrease of contact strength and contact time between the head and the disk.

It may be desirable that at each of the plurality of different control values, the retrieval of written data after the data writing and the determination are performed before data writing at another control value. The data writing at each of the plurality of different control values and the retrieval of the written data may be sequentially performed, gradually decreasing the clearance by varying the control value. This achieves more decrease of contact strength and contact time between the head and the disk.

An embodiments of the method may perform a characteristic test preliminarily on one or some selected tracks, and performs the data writing on a track which has satisfied predetermined criteria in the characteristic test. In an embodiment, the method may retrieve the data written at one control value for a plurality of times, and performs the determination based on the plurality of times of retrieval. This achieves more accurate determination.

The data writing may be performed under milder conditions than write inhibit conditions in a normal write operation of user data. This may help to prevent the contact time and the test time from getting long.

The determination may be performed after error correction has been made on data retrieved with the head, and correction capability in the error correction is lower than correction capability in a normal read operation of user data. This achieves more accurate determination.

Another aspect of embodiments of the present invention is a manufacturing method of a disk drive device. The manufacturing method assembles a disk drive device having a head and a disk in which a clearance between the head and the disk is adjustable. It adjusts the clearance by varying a control value for controlling a clearance adjustment amount between the head and the disk and writes data onto the disk with the head at each of a plurality of different control values. It retrieves the data written at each of the plurality of different control values with the head and determines whether or not the data have been properly written at each of the control values. It specifies a control value for controlling a clearance adjustment amount in a normal operation based on a control value at which it has been determined that the data had not been written properly.

Yet another aspect of embodiments of the present invention is a disk drive device which specifies a control value for an adjustment mechanism of a clearance between a head and a disk. This disk drive device comprises a head for writing and retrieving data to and from a disk, a clearance adjustment mechanism for adjusting a clearance between the head and the disk, and a controller for controlling the head and the clearance adjustment mechanism. The controller adjusts the clearance by varying a control value for the clearance adjustment mechanism. The head writes data onto the disk at each of a plurality of different control values and retrieves the data written at each of the plurality of different control values. The controller determines whether or not the data have been properly written at each of the control values, and specifies a control value for the clearance adjustment mechanism in a normal operation based on a control value at which the controller has determined that the data had not been written properly.

Embodiments of the present invention may achieve decreased damage of the head or the disk in specifying the control value for adjusting the clearance between the head and the disk.

Hereinafter, certain embodiments to which the present invention is applicable will be described. For clarity of explanation, the following description and the accompanying drawings contain omissions and simplifications as appropriate. Throughout the drawings, like components are denoted by like reference numerals, and their repetitive description is omitted if not necessary for the sake of clarity. Hereinbelow, certain embodiments of the present invention will be described by way of example of a hard disk drive (HDD) as an example of a disk drive device. A feature of certain of the present embodiments is a technique for specifying a control value for controlling a clearance between a head element portion and a magnetic disk.

First, an entire configuration of an HDD is outlined. FIG. 1 is a block diagram schematically showing the entire configuration of an HDD 1. The HDD 1 includes a circuit board 20 fixed outside of an enclosure 10. On the circuit board 20, circuits such as a read-write channel (RW channel) 21, a motor driver unit 22, an integrated circuit (HDC/MPU) 23 of a hard disk controller (HDC) and an MPU, and an RAM 24 are implemented.

In the enclosure 10, a spindle motor (SPM) 14 rotates a magnetic disk 11 at a specific angular rate. The magnetic disk 11 is a disk for storing data. The motor driver unit 22 drives the SPM 14 in accordance with control data from the HDC/

MPU 23. Each head slider 12 includes a slider flying over the magnetic disk and a head element portion which is fixed to the slider and converts magnetic signals and electric signals (reads and writes data). The head slider 12 according to the present embodiment includes a heater which expands and protrudes the head element portion by heat for thermal fly-height control (TFC) adjusting the clearance between the head element portion and the magnetic disk 11. This heater is an adjustment mechanism for adjusting the clearance between the head element portion and the magnetic disk 11. The structure of the head slider 12 will be described later in detail referring to FIG. 3.

Each head slider 12 is fixed to a tip end of an actuator 16. The actuator 16, which is coupled to a voice coil motor (VCM) 15, pivots about a pivotal shaft to move the head slider 12 above the magnetic disk 11 in its radial direction. The motor driver unit 22 drives the VCM 15 in accordance with control data from the HDC/MPU 23. An arm electronics (AE) 13 selects a head slider 12 to access (read from or write to) the magnetic disk 11 from a plurality of head slider 12 in accordance with control data from the HDC/MPU 23 and amplifies read/write signals. The AE 13 also supplies the heater of the head slider 12 selected in accordance with the control data from the HDC/MPU 23 with electric power (electric current) and functions as an adjustment circuit for adjusting the electric energy.

The RW channel 21 amplifies read signals supplied from the AE 13 by auto gain control (AGC) using a variable gain amplifier (VGA) to a specific amplitude in a read operation. Then, the RW channel 21 extracts data from the obtained read signals to perform a decoding process. The decoded data are supplied to the HDC/MPU 23. The RW channel 21 code-modulates write data supplied from the HDC/MPU 23 and further converts the code-modulated data into write signals to supply them to the AE 13.

In the HDC/MPU 23 as an example of a controller, an MPU operates in accordance with firmware loaded in the RAM 24. The HDC/MPU 23 performs entire control of the HDD 1 in addition to necessary processes concerning data processing such as read/write process control, command execution order management, positioning control of the head slider 12 using servo signals (servo control), interface control to and from a host 51, defect management, and error handling processes. The HDC/MPU 23 according to the present embodiment specifies heater power values depending on operating conditions and the head slider 12, and sets and registers the values in the HDD 1 in its manufacturing process in addition to performing the TFC. This will be described in detail later.

Figure 2:
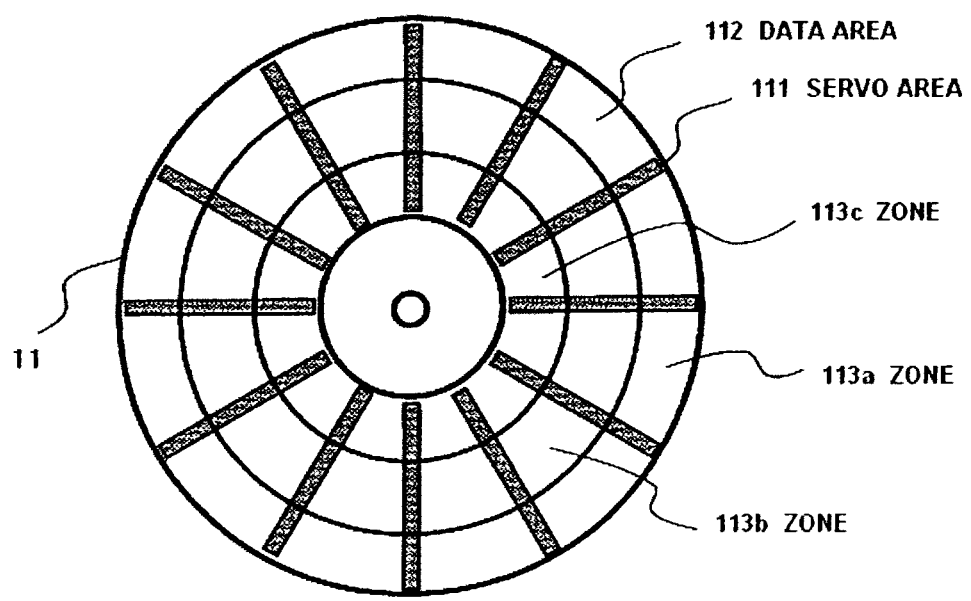
FIG. 2 schematically shows servo data and user data recorded on a recording surface of a magnetic disk according to one embodiment.

FIG. 2 schematically shows recorded data on the magnetic disk 11. As shown in FIG. 2, on the recording surface of the magnetic disk 11, a plurality of servo areas 111 extending radially in the radial direction from the center of the magnetic disk 11 at every specific angle and data areas 112 between the adjoining two servo areas 111 are formed. The servo areas 111 and data areas 112 are provided alternately at a specific angle. In each servo area 111, servo data for controlling positioning of the head slider 12 are recorded. In each data area 112, user data are recorded. The user data and the servo data are recorded on concentric data tracks and servo tracks, respectively. Data tracks are divided into a plurality of groups of zones in accordance with radial position on the magnetic disk 11. A recording frequency is set to each zone. In FIG. 2, three zones 113a to 113c are exemplified.

Figure 3:
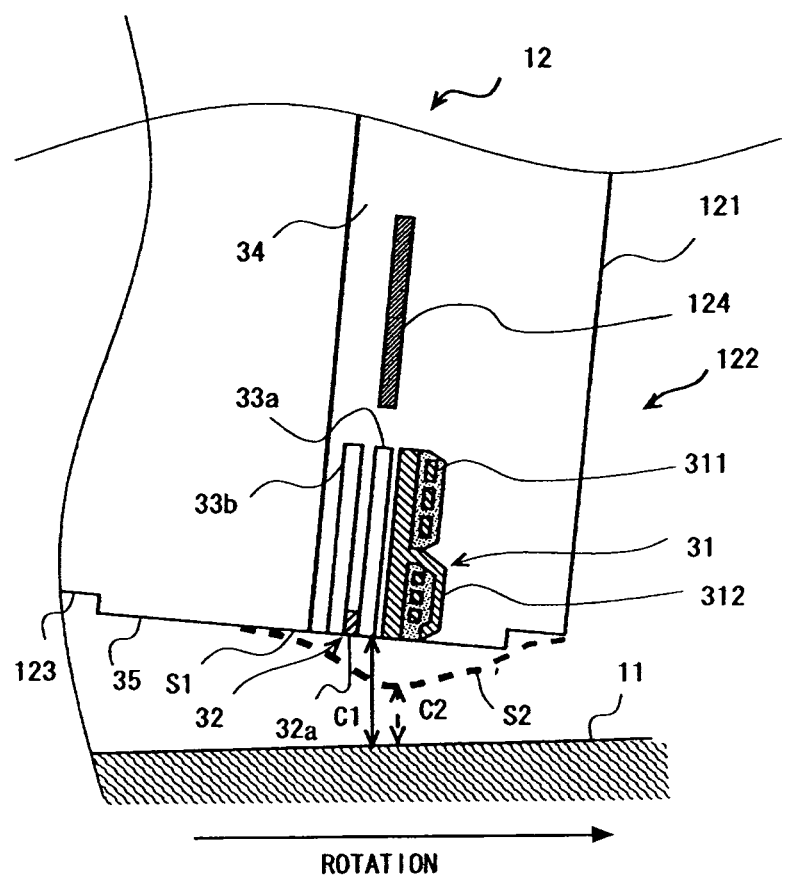
FIG. 3 is a cross-sectional view schematically showing the configuration of a head slider having a heater for TFC in one embodiment.
Figure 4A:
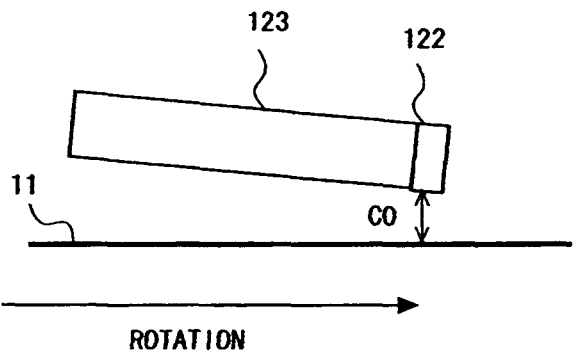
FIGS. 4(a)-4(d) schematically illustrate respective states of the head slider in data writing in the method for determining contact by writing data with varied heater power values and whether or not being able to retrieve the data without an error in one embodiment.
Figure 4B:
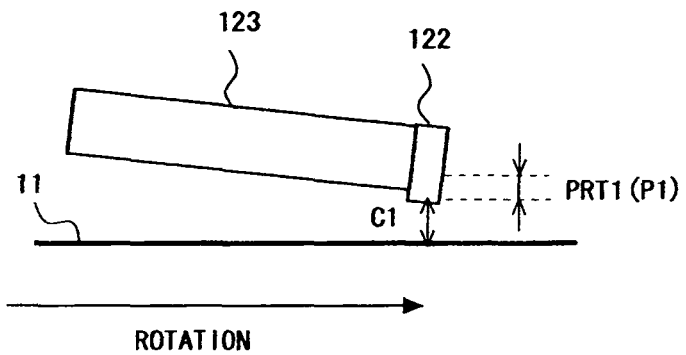
Figure 4C:
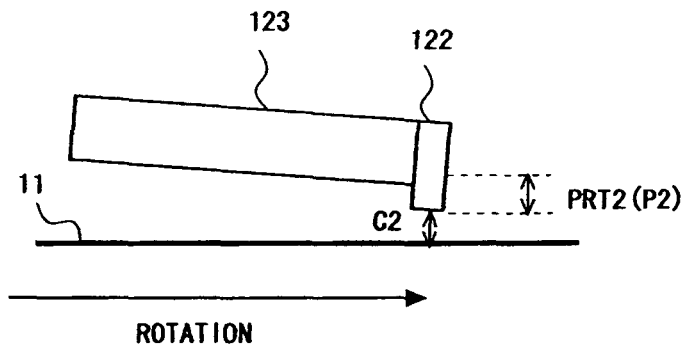
Figure 4D:
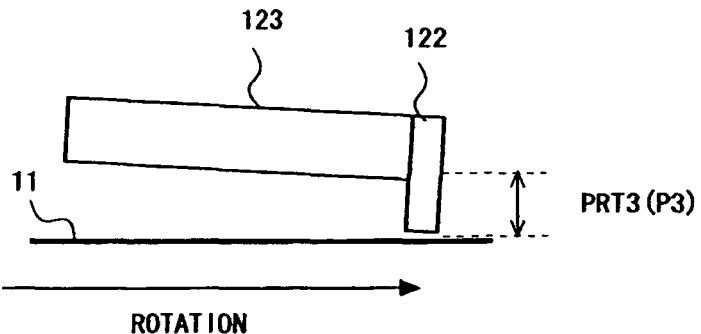

Next, the configuration of the TFC head slider 12 according to the present embodiment will be described. FIG. 3 is a cross-sectional view schematically showing a partial configuration in the vicinity of air flowing end surface (trailing side end surface) 121 of the head slider 12. The magnetic disk 11 rotates from the left to the right in FIG. 3. The head slider 12 includes a head element portion 122 as an example of a head and a slider 123 for holding the head element portion 122. The head element portion 122 has a read element 32 and a write element 31. The write element 31 generates magnetic fields between magnetic poles 312 by means of electric current flowing across a write coil 311 to record magnetic data onto the magnetic disk 11. The read element 32 has a magnetoresistive element 32a having magnetic anisotropy and retrieves magnetic data by means of resistance changing in accordance with magnetic fields from the magnetic disk 11.

The magnetoresistive element 32a is sandwiched between magnetic shields 33a and 33b. A protective film 34 made of such as alumina is formed around the write element 31 and the read element 32. A heater 124 is formed in the vicinity of the write element 31 and the read element 32. The heater 124 can be formed by winding a thin film resistive element using permalloy.

When the AE 13 supplies the heater 124 with electric power, the vicinity of the head element portion 122 is deformed to protrude due to the heat of the heater 124. For example, in non-heating, the shape of the ABS of the head slider 12 is indicated by S1 and the clearance between the head element portion 122 and the magnetic disk is indicated by C1. The protruding shape S2 in heating the heater 124 is schematically illustrated by a dashed line in FIG. 3. The head element portion 122 comes close to the magnetic disk 11 and the clearance C2 at this time is smaller than the clearance C1. FIG. 3 is a conceptual view and its dimensions are not rigidly defined. The protruding amount of the head element portion 122, or the clearance between the head element portion 122 and the magnetic disk 11, varies in accordance with the heater power supplied to the heater 124. The heater power value is a control value for controlling the clearance adjustment amount.

The clearance between the head element portion 122 and the magnetic disk 11 varies with the environmental temperature (the temperature in the enclosure 10), the air pressure, the operating conditions in reading/writing, and the like. Specifically, the protruding amount of the head element portion 122 increases as the temperature rises so that the clearance between the magnetic disk 11 and the head element portion 112 decreases. The fly-height of the slider 123 decreases as the air pressure goes down so that the clearance decreases. Or, the head element portion 122 protrudes due to heat generation of the write coil 311 in a write operation so that the clearance gets smaller in data writing than in data retrieving.

The clearance amount in an OFF state of the heater 124 and the relationship between the heater power and the clearance vary with every head slider 12. It is therefore required that the heater power is controlled in accordance with the environmental and operating conditions and it is preferable that the heater power is controlled for each head slider 12.

The HDC/MPU 23 according to the present embodiment calibrates a heater power value for each head slider 12 in accordance with the environmental and operating conditions. The HDC/MPU 23 determines the clearance between the head element portion 122 and the magnetic disk 11 at a specific heater power value including the heater OFF state under specific conditions. Further, it determines the clearance variation in accordance with variation in the heater power value, the clearance variation in accordance with change in environmental conditions such as temperature change, and the clearance variation in accordance with the write current amount. The HDC/MPU 23 specifies the optimum heater power value for each head slider 12 corresponding to the environmental and operating conditions from these relational expressions.

A feature of the present embodiment is a method for determining the clearance at a specific heater power value among the above-described processes. The HDC/MPU 23 varies the clearance with respect to the selected head slider 12 by TFC and writes data onto the magnetic disk 11 at a plurality of different heater power values. The HDC/MPU 23 retrieves respective data written at the different heater power values by the head slider 12. The HDC/MPU 23 determines whether or not an error is present in each read operation at each of the heater power value. If the data cannot be retrieved properly and an error has occurred, the HDC/MPU 23 determines that a contact between the head slider 12 (the head element portion 122) and the magnetic disk 11 occurred in data writing at the particular heater power value.

The difference between a specific heater power value and the heater power value at which a contact has been determined represents the clearance at the time of data writing at the specific heater power value. For example, if the above-described specific heater power value is zero, the heater power value where the contact has been determined represents the clearance in data writing in an OFF state.

A specific example of an embodiment of a method for determining contact will be described. The method writes data at varied heater power values and determines whether or not the data can be retrieved properly without error to determine contact. FIGS. 4(*a*)-4(*d*) schematically show states of the head slider 12 in data writing according to this method. First, as shown in FIG. 4(*a*), the head slider 12 writes data in a state that the heater power is OFF. The clearance between the head element portion 122 and the magnetic disk 11 surface in this data writing is indicated by C0. Even in the heater OFF state, the clearance in data writing decreases due to heat generation of the write coil 311.

Next, the HDC/MPU 23 performs a read operation for the written data and the head slider 12 retrieves the written data (not shown). The heater power value at the time of retrieving the data is not particularly specified. If the head slider 12 does not contact the magnetic disk 11 and keeps the clearance to properly retrieve the data, any value may be allowed. In the following, the heater power value in data retrieving is assumed to be constant at a level such that the head slider 12 does not contact the magnetic disk 11.

If the head slider 12 accurately retrieves proper data, the HDC/MPU 23 determines that no contact occurs. Then, as shown in FIG. 4(*b*), the HDC/MPU 23 makes the head element portion 122 protrude at the heater power value of P1. The protruding amount at this time is denoted by PRT 1. The clearance in data writing at the heater power value P1 is indicated by C1 and C1<C0. At this heater power value P1, the head slider 12 writes data. After that, the HDC/MPU 23 performs a read operation for the data written at the heater power value P1 (not shown). The operating conditions on this occasion such as the heater power value may be the same as the ones at the time of retrieving data written in the heater OFF state.

If the head slider 12 retrieves the data without error, the HDC/MPU 23 determines that no contact occurs in writing at the heater power P1. Then, as shown in FIG. 4(*c*), the HDC/MPU 23 changes the heater power value to P2 to make the head element portion 122 protrude more. The protruding amount at this time is denoted by PRT 2. P2 is greater than P1 and the clearance C2 at P2 is smaller than C1. At this heater power value P2, the head slider 12 writes data. After that, the HDC/MPU 23 performs a read operation for the data written at the heater power value P2 (not shown). The operating conditions on this occasion such as the heater power value may be the same as the ones at the time of retrieving data written in the heater OFF state.

If the head slider 12 retrieves the data without error, the HDC/MPU 23 determines that no contact occurs in writing at the heater power P2. Then, as shown in FIG. 4(*d*), the HDC/MPU 23 changes the heater power to P3 to make the head element portion 122 protrude much more. The protruding amount at this time is denoted by PRT 3. P3 is greater than P2 and the clearance at P3 is smaller than C1. In the example of FIG. 4(*d*), the head element portion 122 is in contact with the magnetic disk 11. The clearance between the head element portion 122 and the magnetic disk 11 varies in data writing. If the head slider 12 contacts the magnetic disk 11, the head slider 12 vibrates in the direction of height and repeats contact intermittently.

The head slider 12 writes data at the heater power value P3. If the head slider 12 contacts the magnetic disk 11, however, the head element portion 122 cannot properly write data onto the magnetic disk 11. The head slider 12 cannot retrieve the data written at the heater power value P3 so that an error occurs. When an error occurs in a read operation, the HDC/MPU 23 determines that contact between the head slider 12 (head element portion 122) and the magnetic disk 11 has occurred in the writing of the data.

In the above-described method, after writing data at a specific heater power value, the HDC/MPU 23 performs a read operation for the written data and makes a decision on proper data writing before writing data at a different heater value. Namely, it performs writing and retrieving data alternately. Thereby, it can detect contact between the head slider 12 and the magnetic disk 11 at an earlier timing, which reduces the contact strength between the head slider 12 and the magnetic disk 11 and decreases frequencies and opportunities of contact. The heater power value, as described referring to FIGS. 4(*a*)-4(*d*), preferably increases step by step and uniformly, which reduces the contact strength between the head slider 12 and the magnetic disk 11 and decreases frequencies and opportunities of contact.

As described above, determining whether or not data is properly written by writing data while adjusting the clearance and retrieving the data leads to determining the clearance (heater power value) where contact between the head slider 12 and the magnetic disk 11 occurs. On this occasion, contact determination by use of the data written on the data area, rather than servo data, enables accurate detection of smaller vibration of the head slider 12, or weaker contact between the head slider 12 and the magnetic disk 11.

The method of the present embodiment measures the clearance by varying the heater power in data writing. In data writing, heat is generated in the write coil 311 in addition to the heater 124. Therefore, the head element portion 122 expands and protrudes in the vicinity of the write element 31. When the head element portion 122 and the magnetic disk 11 contact, the vicinity of the write element 31 is more likely to contact the magnetic disk 11 than the read element 32. Since the write element 31 is more resistant comparing to the read element 32 formed of an MR element such as a GMR element and a TMR element, damage to the read element 31 can be suppressed according to the present embodiment.

Figure 5:
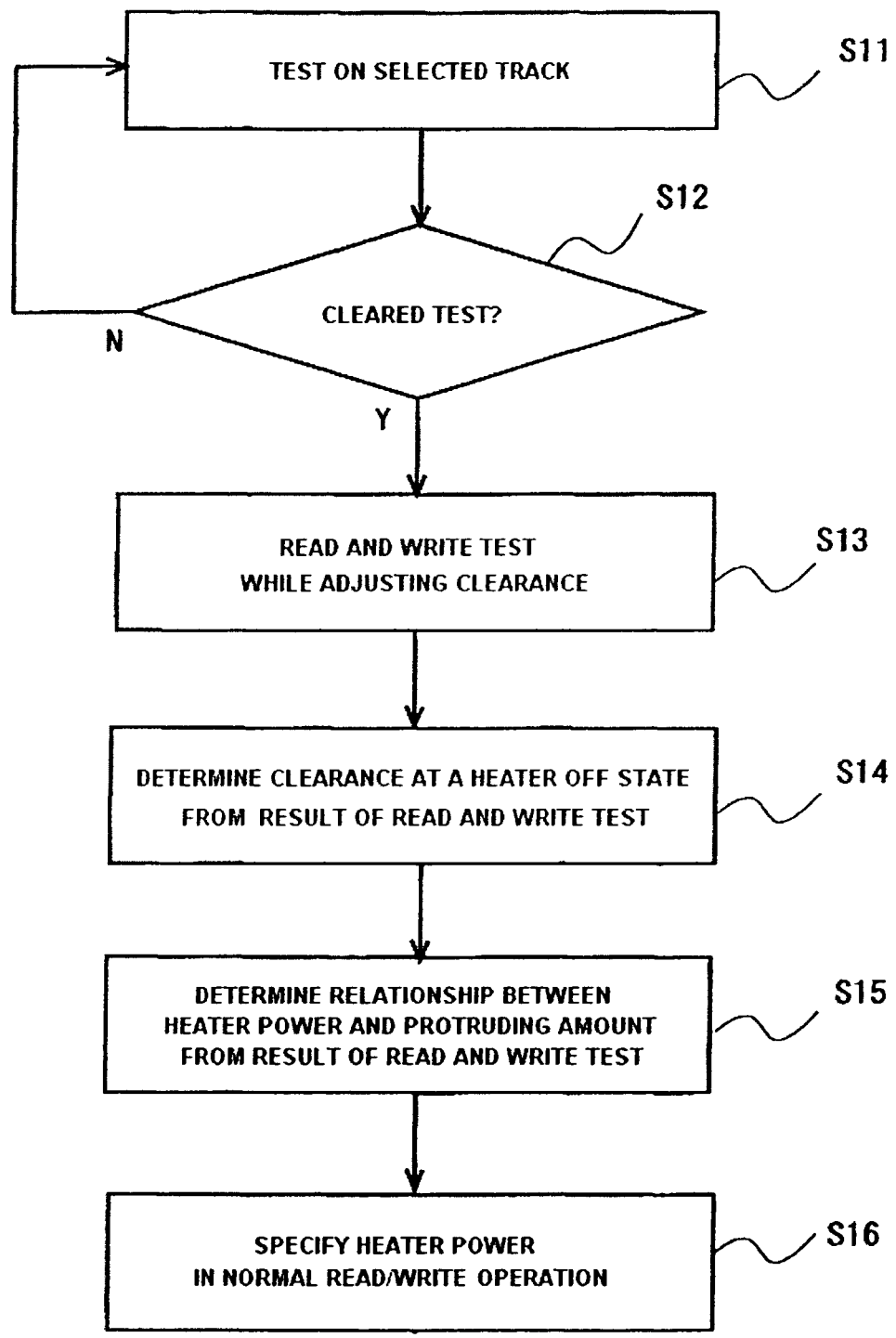
FIG. 5 is a flowchart illustrating an entire procedure of calibration of the heater power value in one embodiment.

Hereinbelow, a flow of calibration of the heater power value according to the present embodiment and clearance measurement in the calibration, and operation of each component within the HDD 1 in the clearance measurement will be described. FIG. 5 is a flowchart illustrating an entire procedure of the calibration of the heater power value according to the present embodiment. The HDC/MPU 23 first selects a track to be written on for a clearance measurement and carries out a predetermined characteristic test on the selected track (S11). If the selected track does not satisfy predetermined criteria (N in S12), the HDC/MPU 23 selects a different data track and carries out the same test (S11).

If the specific data track clears the above-described test (Y in S12), the HDC/MPU 23 carries out the clearance measurement according to the above-described manner (S13). That is, the HDC/MPU 23 carries out a read and write test while adjusting the clearance by TFC. Then, the HDC/MPU 23 determines the distance of the clearance in data writing in a heater OFF state using the heater power value specified by the read and write test in S13 (S14). Further, the HDC/MPU 23 determines the relationship between the heater power and the protruding amount using the heater power value determined by the read and write test in S13 (S15).

The HDC/MPU 23 specifies the heater power value in a normal read operation and/or a write operation using the value and the relationship determined in S14 and S15 (S16). The HDC/MPU 23 determines the relationship between the write current and the protruding amount (clearance variation), the relationship between the temperature and the protruding amount (clearance variation), the relationship between the air pressure and the protruding amount (clearance variation), and the like by calibration. From these relationships and the values and relationships obtained in the steps S14 and S15, an appropriate heater power value for the environmental and operating conditions of the subject head slider 12 can be specified.

For example, the protruding amount by temperature change with respect to a reference temperature is assumed to be PRT_T, the protruding amount by heating of the heater 124 to be PRT_H, and the protruding amount by write current to be PRT_W. The respective protruding amounts, for example, are expressed by distances in the unit of nm. The whole protruding amount PRT_TTL[nm] is (PRT_T+PRT_H+PRT_W) where these amounts are added. PRT_T and PRT_W for each head slider 12 are preliminarily determined by calibration. These methods have been widely known in the art and explanations thereof are omitted. Depending on the designs, variations in the other protruding amounts should be considered.

The clearance in data writing in the heater OFF state is determined (S14) from the result of the read and write test (S13) explained referring to the flowchart of FIG. 5. Since the protruding amount by write current PRT_W is determined, the clearance in retrieving data in the heater OFF state is determined. Therefore, the HDC/MPU 23 can specify the heater power value corresponding to the environmental and operating conditions from these values and relationships.

Although, for more accurate control, the above PRT_T and PRT_W are preferably calibrated for each head slider 12, the same value (relationship) determined in designing may be used for the head sliders in the same design or on one wafer. PRT_W may be determined by relating the write current to the heater power value of the heater 124. PRT_H and PRT_W may vary with temperature.

As in the above example, the clearance between the head element portion 122 and the magnetic disk 11 is preferably determined with an actual distance. This is because the result of evaluation for reliability shows that the physical distance between the head element portion 122 and the magnetic disk 11 significantly influences the reliability. However, depending on the design, it may be determined by the set value of the TFC (heater power value). The physical distance between the head element portion 122 and the magnetic disk 11 can be calculated using the read signal strength and the Wallace formula. The signal strength increases as the clearance between the head element portion 122 and the magnetic disk 11 decreases, and decreases as it increases.

Since this method is a widely known technique, detailed explanations are omitted, but the clearance variation Δd between the head element portion 122 (read element 32) and the magnetic disk 11 is expressed by:

$$A1/A0 = \exp(-2\pi\Delta d/\lambda)$$

where the reference signal strength (amplitude) is represented by $A0$; and the measured signal strength, by $A1$. Here, $\lambda$ is a write wavelength of the recording signal used in the signal strength measurement. The HDC/MPU 23 can determine the physical distance of the clearance from this equation. The signal strength can be determined by the VGA amplifier of the RW channel 21, for example.

The calibration explained referring to the flowchart of FIG. 5 performs a characteristic test on data tracks (S11). This eliminates occurrence of an error due to a defect on the data track and enables accurate detection of contact between the head slider 12 and the magnetic disk 11. If such a problem may hardly occur, this test may be omitted. The test on data tracks, for example, writes and retrieves data with the head slider 12 and measures their error rate. The HDC/MPU 23 decides to use the data track in the read and write test (S13) if each data sector can be properly retrieved and the error rate is the reference value or less.

Figure 6:
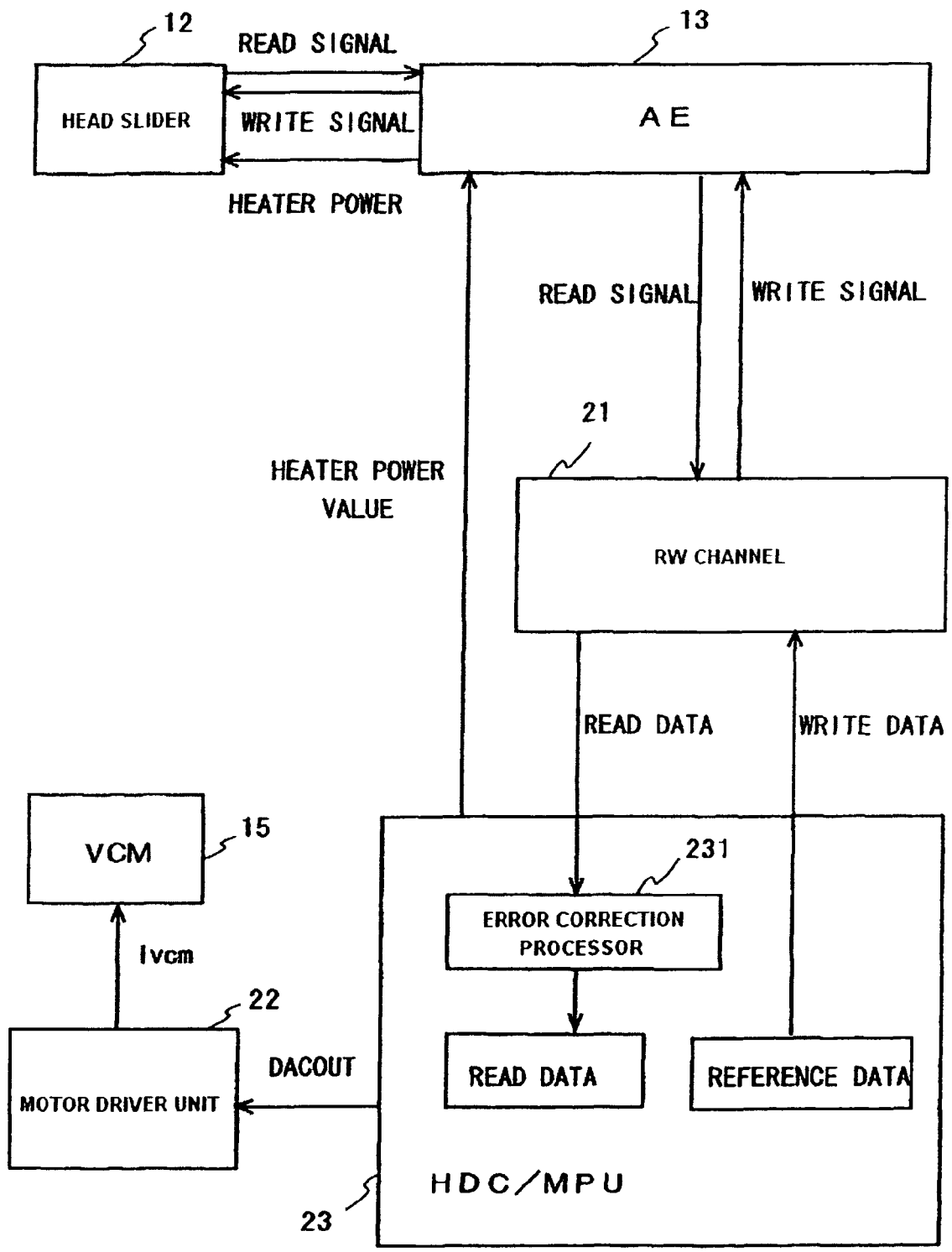
FIG. 6 is a block diagram schematically showing components within the HDD 1 for performing a read and write test using the TFC for the clearance measurement in one embodiment.
Figure 7:
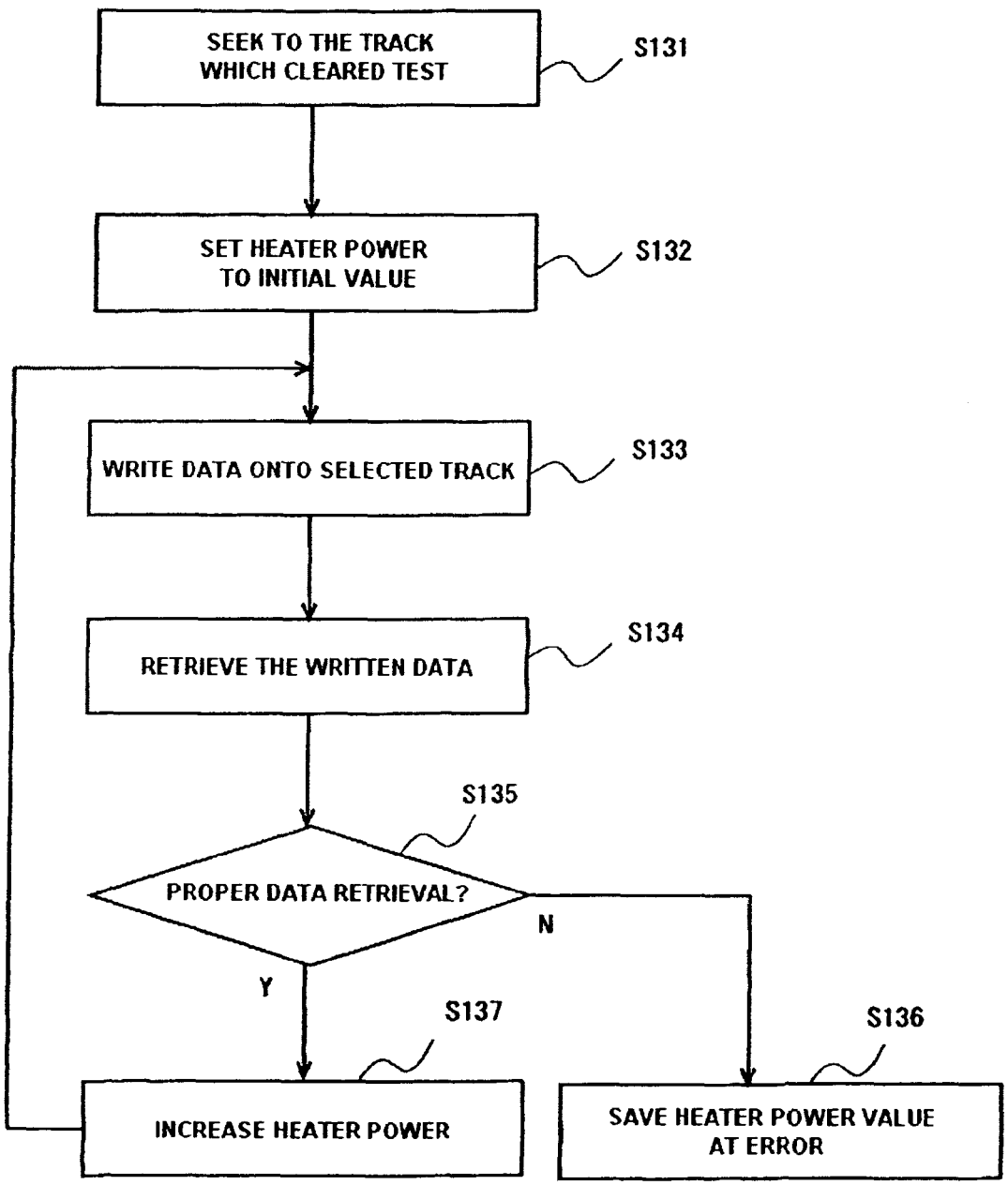
FIG. 7 is a flowchart illustrating the flow of the read and write test using the TFC for the clearance measurement in one embodiment.

Hereinbelow, details of the read and write test (S13) using the TFC for clearance measurement will be described referring to FIGS. 6 and 7. FIG. 6 is a block diagram schematically showing components within the HDD 1 which performs this test. FIG. 7 is a flowchart illustrating the flow of this test. The HDC/MPU 23 moves the head slider 12 for calibration to a data track which has satisfied predetermined criteria in a specific test (S131). Specifically, the HDC/MPU 23 sends control data DACOUT to the motor driver unit 22 so that the servo data retrieved by the head element portion 122 get close to the target value. The motor driver unit 22 supplies electric current Ivcm to the VCM 15 in accordance with the control data DACOUT.

Next, the HDC/MPU 23 sets the heater power value of the heater 124 to an initial value (S132). For example, the initial value is 0. The HDC/MPU 23 varies the power value to be supplied to the heater 124 by controlling the AE 13. As shown in FIG. 6, the HDC/MPU 23 stores data indicating the heater power value (HEATER POWER VALUE) in the register of the AE 13. The AE 13 supplies power (HEATER POWER) indicated by the data stored in the register to the heater 124 of the selected head slider 12.

The HDC/MPU 23 controls the AE 13 and the RW channel 21 to write data (S133) and retrieve the data (S134) with the selected head slider 12. The HDC/MPU 23 determines whether the read element 32 can properly retrieve the written data (S135). If it can properly retrieve the data (Y in S135), the HDC/MPU 23 increases the heater power (S137) and repeats to write the data (S133) and retrieve the data (S134).

If the HDC/MPU 23 cannot properly retrieve the data (N in S135), it determines that contact between the head slider 12 and the magnetic disk 11 has occurred, and stores and saves the data indicating the heater power at that time into the RAM 24 (S136). Hereby, the read and write test (S13) for clearance measurement ends.

The HDC/MPU 23 writes preset reference data (REFERENCE DATA) on a data track in step S133. Since it takes a certain time for the protrusion of the head element portion 122 caused by the write current to be saturated, the HDC/MPU 23 preferably writes data in a plurality of sectors. For example, the HDC/MPU 23 writes data in all sectors on a data track. Typically, the HDC/MPU 23 continuously writes data in one-fourth or more, or a half or more of the data sectors on a data track. Typically, the data to be written are the same in all of the sectors.

In writing the reference data (REFERENCE DATA), it may be preferable that milder write prohibiting conditions are set than in a normal write operation of user data by the HDD 1. For example, in data writing, it is required that the positional error signals indicated by servo data (the difference between the target data and the retrieved servo data) and time variation of the positional error signals (velocity) are within the range of criteria. This prevents data writing in a different position from the target. In the read and write test (S13), milder conditions are set than in a normal write operation of user data. This is because the object of the read and write test (S13) is not preventing errors in writing but detecting errors. Consequently, contact time and test time are prevented from getting long.

Although the data to be written are not particularly limited, data with high writing frequencies are preferred. This is because the higher the writing frequency is, the quicker the protrusion of the head element portion 122 can be saturated. Therefore, for example, the data writing frequency to be used in the test is set to the intermediate value or more in the writing frequency range for user data (between the maximum value and the minimum value) written in a normal write operation. The read and write test (S13) is conducted on one or more of the data tracks. The number of tracks and the radial position of the track to be used may be changed depending on the design. For more accurate measurement, the test is preferably conducted on a plurality of data tracks.

If a measurement is made on one data track, use of a data track in the outer zone where the writing frequency is highest will cause quicker protrusion of the head slider 12. Or, since the velocity of the head slider 12 in the circumferential direction is lower as the data track is inner, selecting the data track to be used in the measurement from the inner circumferential area than the center of the data area results in preventing generation of damage onto the head element portion 122.

In the step S134, the HDC/MPU 23 obtains data (READ DATA) extracted from the read signals (READ SIGNAL) obtained by the RW channel 21 from the AE 13 from the RW channel 21 and performs an error correction in an error correction processor 231. The error correction processor 231 performs an error correction with ECC codes. If the error correction processor 231 cannot restore the correct data by the error correction, an error occurs (N in S135). The error correction capability (number of correctable bytes) of the error correction processor 231 is preferably set to be lower than the error correction capability in a normal read operation of the HDD 1. In this way, setting the conditions for the error correction severer achieves a more accurate test.

Depending on the design, the HDC/MPU 23 may not perform the error correction but may determine whether or not the obtained data is proper. The HDC/MPU 23 compares the data obtained from the RW channel 21 to the reference data (REFERENCE DATA) preliminarily held to determine accurate data retrieving.

When writing to and reading from a plurality of data sectors are performed in the read and write test (S13), the HDC/MPU 23 determines that the data cannot be retrieved if errors have occurred in more than the reference number of data sectors. Preferably, the reference number is one and the HDC/MPU 23 determines that the data cannot be properly retrieved if an error occurs in any data sector. This leads to detection of contact between the head slider 12 and the magnetic disk 11 at an earlier stage.

Preferably, the HDC/MPU 23 performs a plurality of times of read operations from one sector (S134) for accurate data retrieving. If the HDC/MPU 23 can retrieve data properly without error for more than the reference times during the plurality of times of read operations, for example even once, it determines that a proper data writing has been made to the particular data sector. Although the set of the data writing (S133) and data reading (S134) is preferably repeated for a plurality of times, the HDC/MPU 23 may perform data writing (S133) once and reading the data (S134) for a plurality of times. This achieves more accurate determination.

As set forth above, the present invention is described by way of particular embodiments but is not limited to the above embodiments. A person skilled in the art can easily modify, add, and convert the each element in the above embodiments within the scope of embodiments of the present invention. For example, the clearance measurement by means of the above-described read and write test may be applied to a disk drive device having a clearance adjustment mechanism for adjusting the clearance between the head slider and the magnetic disk other than the TFC, such as a piezo element. Embodiments of the present invention may also be applied to a manufacturing process of an HDD. The manufacturing method performs the calibration according to embodiments of the present invention after fabricating the HDD 1 shown in FIG. 1. The circuit for performing embodiments of the present invention may not be a circuit to be implemented onto an HDD product but a test circuit used in the manufacturing process.

What is claimed is:

1. A method for specifying a control value for controlling a clearance adjustment amount in a disk drive device in which a clearance between a head and a disk is adjustable, the method comprising:
   adjusting the clearance by varying the control value associated with a heater power at each of a plurality of different control values, said heater power directly associated with said clearance and during a calibration operation writing reference data onto the disk with the head at each of said plurality of different control values;
   retrieving during said calibration operation the reference data written at each of the plurality of different control values with the head and determining after error correction has been made on data retrieved with the head, whether or not the data have been properly written at each of the control values wherein correction capability in the error correction is lower than correction capability in a normal read operation of user data;
   specifying a control value for controlling a clearance adjustment amount in a normal operation based on a control value at which it has been determined that the reference data had not been written properly;
   writing data in a normal operation at said control value;
   retrieving the data written at one control value for a plurality of times; and
   performing the determination based on the plurality of times of retrieval.

2. The method according to claim 1, wherein at each of the plurality of different control values, the retrieval of written data after the data writing and the determination are performed before data writing at another control value.

3. The method according to claim 2, wherein the data writing at each of the plurality of different control values and the retrieval of the written data are sequentially performed, gradually decreasing the clearance by varying the control value.

4. The method according to claim 1, further comprising:
performing a characteristic test preliminarily on one or some selected tracks; and
performing the data writing on a track which has satisfied predetermined criteria in the characteristic test.

5. The method according to claim 1, wherein the data writing is performed under milder conditions than write inhibit conditions in a normal write operation of user data.

6. A manufacturing method of a disk drive device comprising:
assembling a disk drive device having a head and a disk in which a clearance between the head and the disk is adjustable;
adjusting the clearance by varying the control value associated with a heater power at each of a plurality of different control values, said heater power directly associated with said clearance and during a calibration operation writing reference data onto the disk with the head at each of a plurality of different control values;
retrieving during said calibration operation the reference data written at each of the plurality of different control values with the head and determining after error correction has been made on data retrieved with the head, whether or not the data have been properly written at each of the control values wherein correction capability in the error correction is lower than correction capability in a normal read operation of user data;
specifying one of said plurality of different control values for controlling a clearance adjustment amount in a normal operation based on a control value at which it has been determined that the reference data had not been written properly;
writing data in a normal operation at said one control value;
retrieving the data written at one control value for a plurality of times; and
performing the determination based on the plurality of times of retrieval.

7. The method according to claim 6, wherein at each of the plurality of different control values, the retrieval of written data after the data writing and the determination are performed before data writing at another control value.

8. The manufacturing method of a disk drive device according to claim 7, wherein the data writing at each of the plurality of different control values and the retrieval of the written data are sequentially performed, gradually decreasing the clearance by varying the control value.

9. The manufacturing method of a disk drive device according to claim 6, further comprising:
performing a characteristic test preliminarily on one or some selected tracks; and performing the data writing on a track which has satisfied predetermined criteria in the characteristic test.

10. The manufacturing method of a disk drive device according to claim 6, wherein the data writing is performed under milder conditions than write inhibit conditions in a normal write operation of user data.

11. A disk drive device which specifies a control value for an adjustment mechanism of a clearance between a head and a disk, the disk drive device comprising:
a head configured to write and retrieve data to and from a disk;
a clearance adjustment mechanism configured to adjust a clearance between the head and the disk at each of a plurality of different control values; and
a controller configured to control the head and the clearance adjustment mechanism;
wherein
the controller adjusts the clearance during a calibration operation by varying a control value associated with a heater power at each of a plurality of different control values, said heater power directly associated with said clearance wherein said control value is for the clearance adjustment mechanism;
the head writes during said calibration operation reference data onto the disk at each of a plurality of different control values and retrieves reference the data written at each of the plurality of different control values during said calibration operation;
the controller determines, during said calibration operation and after error correction has been made on data retrieved with the head, whether or not the reference data have been properly written at each of the control values, and specifies one-control value for the clearance adjustment mechanism in a normal operation based on a control value at which the controller has determined that the reference data had not been written properly wherein correction capability in the error correction is lower than correction capability in a normal read operation of user data; and
the head writes data in a normal operation at said one specified control value, wherein the head retrieves the data written at one control value for a plurality of times and wherein the controller performs the determination based on the plurality of times of retrieval.

12. The disk drive device according to claim 11, wherein
at each of the plurality of different control values, the head retrieves written data after writing the data and before writing data at another control value; and
the controller performs the determination at each control value before the head writes data at another control value.

13. The disk drive device according to claim 12, wherein
the controller varies the control value to gradually decrease the clearance; and
the head performs the data writing at each of the plurality of different control values and retrieve of the written data sequentially.

14. The disk drive device according to claim 11, wherein the controller performs the data writing under milder conditions than write inhibit conditions in a normal write operation of user data.

* * * * *